(12) United States Patent
Hong et al.

(10) Patent No.: US 12,291,307 B2
(45) Date of Patent: May 6, 2025

(54) ELECTRIC BICYCLE DRIVING DEVICE AND METHOD THEREFOR

(71) Applicant: HL MANDO CORPORATION, Gyeonggi-do (KR)

(72) Inventors: Kyung Ho Hong, Seoul (KR); Seungkyung Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 668 days.

(21) Appl. No.: 17/615,545

(22) PCT Filed: May 29, 2020

(86) PCT No.: PCT/KR2020/007010
§ 371 (c)(1),
(2) Date: Nov. 30, 2021

(87) PCT Pub. No.: WO2020/242248
PCT Pub. Date: Dec. 3, 2020

(65) Prior Publication Data
US 2022/0234680 A1    Jul. 28, 2022

(30) Foreign Application Priority Data

May 31, 2019    (KR) .......................... 10-2019-0064806

(51) Int. Cl.
*B62M 6/50*    (2010.01)
*B60L 15/20*    (2006.01)
(Continued)

(52) U.S. Cl.
CPC .............. *B62M 6/50* (2013.01); *B60L 15/20* (2013.01); *B60L 2200/12* (2013.01);
(Continued)

(58) Field of Classification Search
CPC ....................................................... B62M 6/50
See application file for complete search history.

(56) References Cited

U.S. PATENT DOCUMENTS 7,021,978 B2 *   4/2006   Jansen .................... B63H 23/24
                                                    280/212
10,376,731 B2 *  8/2019   Fuchs .................. B60L 15/2009
(Continued)

FOREIGN PATENT DOCUMENTS

EP          3 360 769         8/2018
KR      10-2017-0022179       3/2017
(Continued)

OTHER PUBLICATIONS

International Search Report for PCT/KR2020/007010 mailed on Sep. 17, 2020 and its English translation from WIPO (now published as WO 2020/242248).

(Continued)

*Primary Examiner* — Kevin Hurley
*Assistant Examiner* — Hosam Shabara
(74) *Attorney, Agent, or Firm* — WOMBLE BOND DICKINSON (US) LLP

(57) ABSTRACT

The present invention relates to a system for driving a chainless electric bicycle comprising: a driving wheel; a pedal; a motor mechanically connected to the driving wheel; a generator mechanically connected to the pedal; and a battery, wherein provided is a system comprising: a generator location sensor for measuring the value of a rotation location of the generator; a motor location sensor for measuring the value of a rotation location of the motor; and a controller configured to calculate a difference value of the value of the rotation location of the motor minus the value of the rotation location of the generator multiplied by a gear (Continued)

ratio, and to control at least one of the generator and the motor on the basis of the difference value.

16 Claims, 9 Drawing Sheets

(51) Int. Cl.
  *B62M 6/60* (2010.01)
  *B62M 6/90* (2010.01)
(52) U.S. Cl.
  CPC ..... *B60L 2240/12* (2013.01); *B60L 2240/423* (2013.01); *B60L 2250/26* (2013.01); *B62M 6/60* (2013.01); *B62M 6/90* (2013.01)

(56) References Cited

U.S. PATENT DOCUMENTS

| | | | | |
|---|---|---|---|---|
| 2006/0095191 | A1* | 5/2006 | Lin | ............... B60L 50/20 701/84 |
| 2015/0329172 | A1* | 11/2015 | Anderson | ............... B62M 6/40 180/165 |
| 2016/0362021 | A1* | 12/2016 | Sveje | ............... B60L 50/20 |
| 2019/0031284 | A1 | 1/2019 | Fuchs | |

FOREIGN PATENT DOCUMENTS

| | | |
|---|---|---|
| KR | 10-1815735 | 1/2018 |
| KR | 10-2018-0093317 | 8/2018 |
| KR | 10-1896022 | 9/2018 |
| KR | 101896022 B1 * | 9/2018 |

OTHER PUBLICATIONS

Written Opinion of the International Searching Authority for PCT/KR2020/007010 mailed on Sep. 17, 2020 and its English translation by Google Translate (now published as WO 2020/242248).
Office Action dated Jan. 10, 2025 for European Patent Application No. 20 814 300.8.

* cited by examiner

ELECTRIC BICYCLE DRIVING DEVICE AND METHOD THEREFOR

CROSS-REFERENCE TO RELATED APPLICATIONS

The present application is the national stage of International Patent Application No. PCT/KR2020/007010 filed on May 29, 2020, which claims the priority to Korean Patent Application No. 10-2019-0064806 filed in the Korean Intellectual Office on May 31, 2019, the entire contents of which are incorporated herein by reference.

TECHNICAL FIELD

The present invention relates to driving of an electric bicycle, and more particularly, to a technique for driving a chainless electric bicycle.

BACKGROUND ART

An electric bicycle includes a motor for rotating wheels and a battery for supplying power to the motor. Electric bicycles are driven in a way that a motor rotates wheels or in a way that assists a force with which a user presses a pedal. In a chainless electric bicycle among the electric bicycles, a force with which a user presses a pedal is converted into electricity by a generator connected to the pedal, the electricity is stored in a battery, and a motor is turned on by the electricity stored in the battery so that the electric bicycle is moved.

In a typical bicycle, when a user presses pedals with his or her feet, a pedaling force is transmitted to wheels through a chain so that the bicycle is moved. Since the chain is connected from the pedals of the bicycle to the wheels, there are problems in that a length of the chain is long, a structure of the chain is complicated, and the chain comes out of a gear or gets caught in the user's pants, etc.

In order to solve the above problems, chainless electric bicycles have recently been developed and used.

However, in a chainless electric bicycle, there is no load applied to pedals, and thus a user cannot feel a pedaling feeling. The pedaling feeling refers to a counter torque that is felt by a user when the user presses a pedal. As the counter torque increases, an occupant feels that the pedal is heavy, and as the counter torque decreases, the occupant feels that the pedal is light.

A pedaling feeling that the user feels when driving a bicycle with a chain depends on various driving factors, such as an amount of torque when the user applies to the pedal, a gradient of a road surface, and the like. The user is generally familiar with the pedaling feeling that the user can feel when driving a bicycle with a chain. However, when the pedaling feeling cannot be reproduced in a chainless electric bicycle, the user may feel a sense of difference and feel uncomfortable.

A pedaling feeling of a real bicycle with a chain is generated because pedals and a driving wheel are mechanically connected by a chain. In this case, a value obtained by multiplying a rotational position of the driving wheel by a gear ratio is identical to a value of a rotational position of the pedal. That is, in the bicycle with a chain, a rotational position of the pedal is synchronized with a rotational position of the driving wheel. On the other hand, in the chainless electric bicycle, pedals and a driving wheel are not mechanically connected and power generated due to the rotation of the pedal is transmitted to the driving wheel by electronic control, and thus the pedals and the driving wheel are independently rotated. Therefore, since a rotational position of the pedal and a rotational position of the driving wheel of the chainless electric bicycle are not synchronized unlike in the bicycle with a chain, the user feels a sense of difference.

Further, in the bicycle with a chain, a gradient of a road surface and an acceleration of the pedal are directly reflected to the rotation of the driving wheel so that a driving torque of the driving wheel is increased. Therefore, even when the rotational position of the pedal is rapidly changed, the driving wheel immediately follows the rotation of the pedal. However, in the chainless electric bicycle, when the gradient of the road surface or the acceleration of the pedal is not reflected to the rotation of the driving wheel through electronic control, a response of the driving wheel becomes slow even when the rotational position of the pedal is rapidly changed, and thus a driving torque is not sufficiently applied to the driving wheel and the user feels a sense of difference.

In the chainless electric bicycle, since the pedal is not connected to the driving wheel, a speed command or torque command which is applied to a motor is adjusted based on a pedal torque.

However, in the case in which the speed command is used, it is difficult to adjust an acceleration of the motor, and in the case in which the torque command is used, a speed difference may occur in an electric bicycle with two or more motors due to a difference in condition of the road surface on which wheels, on which the motors are mounted, are placed. Accordingly, there is a problem in that the user cannot feel a pedaling feeling or a driving feeling unlike in the bicycle with a chain.

DISCLOSURE

Technical Problem

The present invention is to solve the problems of the related art as described above and is directed to providing a technique for providing a pedaling feeling and a driving feeling to a user of a chainless electric bicycle as in a bicycle with a chain.

The present invention is also directed to providing a technique for allowing a user to feel a pedaling feeling as in a bicycle with a chain by synchronizing a rotational position of a pedal and a rotational position of a driving wheel of a chainless electric bicycle. The present invention is also directed to providing a technique for allowing a rotational position of the driving wheel to rapidly follow a rotational position of the pedal by additionally increasing a driving torque of a driving wheel by reflecting a gradient of a road surface on which a chainless electric bicycle travels and an acceleration of a pedal.

Meanwhile, other objects that are not specified in the present invention will be additionally considered within the range that may be easily inferred from the following detailed descriptions and effects thereof.

Technical Solution

One aspect of the present invention provides a device for driving a chainless electric bicycle, which includes a motor configured to drive a driving wheel, a generator configured to generate power using a pedal, a generator position sensor configured to measure a value of a rotational position of the generator, a motor position sensor configured to measure a value of a rotational position of the motor, and a controller configured to calculate a difference value obtained by subtracting a value obtained by multiplying the value of the rotational position of the motor by a gear ratio from the value of the rotational position of the generator and control the generator or the motor on the basis of the difference value.

Preferably, the controller may control the generator or the motor so that the difference value becomes zero.

Further, when the difference value is greater than zero, the controller may control the generator to increase a counter torque with respect to a driving direction of the generator or may control the motor to increase a driving torque of the motor, and when the difference value is smaller than zero, the controller may control the generator to reduce the counter torque with respect to the driving direction of the generator or may control the motor to reduce the driving torque of the motor.

The device may further include a generator current sensor configured to measure a generator driving current between a battery and the generator and a motor current sensor configured to measure a motor driving current between the battery and the motor, wherein the controller may control the generator by controlling the generator driving current using a target generator current generated based on the difference value as a reference value and using the measured generator driving current as a feedback value and may control the motor by controlling the motor driving current using a target motor current generated based on the difference value as a reference value and using the measured motor driving current as a feedback value.

When the difference value is greater than zero, the controller may increase the generator driving current or increase the motor driving current, and when the difference value is smaller than zero, the controller may reduce the generator driving current or reduce the motor driving current.

The device may further include a gradient sensor configured to measure a gradient of a road on which the electric bicycle travels, wherein the controller may calculate a rotational acceleration of the pedal using the rotational position of the generator and further increase the motor driving current on the basis of a value of the gradient of the road, which is received from the gradient sensor, and the rotational acceleration of the pedal.

Another aspect of the present invention provides a method of driving an electric bicycle, which includes receiving a value of a rotational position of a generator from a generator position sensor, receiving a value of a rotational position of a motor from a motor position sensor, calculating a difference value obtained by subtracting a value obtained by multiplying the value of the rotational position of the motor by a gear ratio from the value of the rotational position of the generator, and controlling the generator or the motor on the basis of the difference value.

Preferably, in the controlling of the generator or the motor, the generator or the motor may be controlled so that the difference value becomes zero.

In the controlling of the generator or the motor, when the difference value is greater than zero, the generator may be controlled to increase a counter torque with respect to a driving direction of the generator or the motor may be controlled to increase a driving torque of the motor, and when the difference value is smaller than zero, the generator may be controlled to reduce the counter torque with respect to the driving direction of the generator or the motor may be controlled to reduce the driving torque of the motor.

In particular, the method may further include receiving a value of a gradient of a road on which the electric bicycle travels from a gradient sensor, calculating a rotational acceleration of a pedal using the rotational position of the generator, and controlling a driving torque of the motor to be further increased on the basis of the value of the gradient of the road and the rotational acceleration of the pedal.

Further, the method may further include measuring a generator driving current between a battery and the generator using a generator current sensor and measuring a motor driving current between the battery and the motor using a motor current sensor, wherein, in the controlling of the generator or the motor, the generator driving current is controlled using a target generator current generated based on the difference value as a reference value and using the measured generator driving current as a feedback value, and the motor driving current is controlled using a target motor current generated based on the difference value as a reference value and using the measured motor driving current as a feedback value.

In the controlling of the generator or the motor, when the difference value is greater than zero, the generator driving current may be increased or the motor driving current may be increased, and when the difference value is smaller than zero, the generator driving current may be reduced or the motor driving current may be reduced.

Still another aspect of the present invention provides a device for driving a chainless electric bicycle, which includes a motor configured to drive a driving wheel, a generator configured to generate power using a pedal, a generator position sensor configured to measure a value of a rotational position of the generator, a motor position sensor configured to measure a value of a rotational position of the motor, a generator current sensor configured to measure a current of the generator, a motor current sensor configured to measure a current of the motor, and a controller configured to calculate a target pedal torque on the basis of a difference between a position of the generator which is measured by the generator position sensor and a position of the motor which is measured by the motor position sensor and control the current of the generator to reach the calculated target pedal torque.

Preferably, the controller may calculate a target motor acceleration according to the calculated target pedal torque, calculate an acceleration of the motor from a change in the measured position of the generator, and control the current of the motor so that the acceleration of the motor reaches the calculated target motor acceleration.

Yet another aspect of the present invention provides a method of controlling a device for driving a chainless electric bicycle which includes receiving a position of a generator from a generator position sensor, receiving a position of a motor from a motor position sensor, calculating a target pedal torque on the basis of a difference between the position of the generator and the position of the motor, and controlling a current of the generator to reach the calculated target pedal torque.

The method may further include, after the controlling of the current of the generator, determining a target motor acceleration according to the calculated target pedal torque, calculating an acceleration of the motor from a change in a detected position of a pedal, and controlling a current of the motor so that the acceleration of the motor reaches the determined target motor acceleration.

Advantageous Effects

According to the present invention, by synchronizing a rotational position of a driving wheel and a rotational position of a pedal of a chainless electric bicycle, a user can feel a pedaling feeling as in a bicycle with a chain.

Further, by additionally controlling a driving torque of a driving wheel by reflecting a gradient of a road surface on which a chainless electric bicycle travels and an acceleration of a pedal, a rotational position of a driving wheel can rapidly follow a rotational position of a pedal.

Further, it is possible to more effectively improve a pedaling feeling as in a bicycle with a chain regardless of a road surface on which a chainless electric bicycle travels.

Further, by applying an acceleration command to a motor, an acceleration of the motor can be adjusted.

Meanwhile, it is added that effects, which are not explicitly described herein but are described in the following specification expected by the technical features of the present invention, and their potential effects are treated as those described in the specification of the present invention.

The accompanying drawings are exemplified by reference for understanding the technical idea of the present invention and the scope of the present invention is not limited thereby.

MODES OF THE INVENTION

Hereinafter, configurations of the present invention guided by various embodiments of the present invention and effects resulting from the configurations will be described with reference to the accompanying drawings. In descriptions of the present invention, when detailed descriptions of related known configurations or functions are deemed to unnecessarily obscure the gist of the present invention, they will be omitted.

It should be understood that, although terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the present invention. Further, as used herein, the singular forms "a" and "an" are intended to also include the plural forms, unless the context clearly indicates otherwise. Unless otherwise defined, all terms in the embodiments of the present invention have the same meaning as commonly understood by one of ordinary skill in the art to which this invention belongs.

Hereinafter, the configurations of the present invention guided by various embodiments of the present invention and effects resulting from the configurations will be described with reference to the accompanying drawings.

Figure 1:
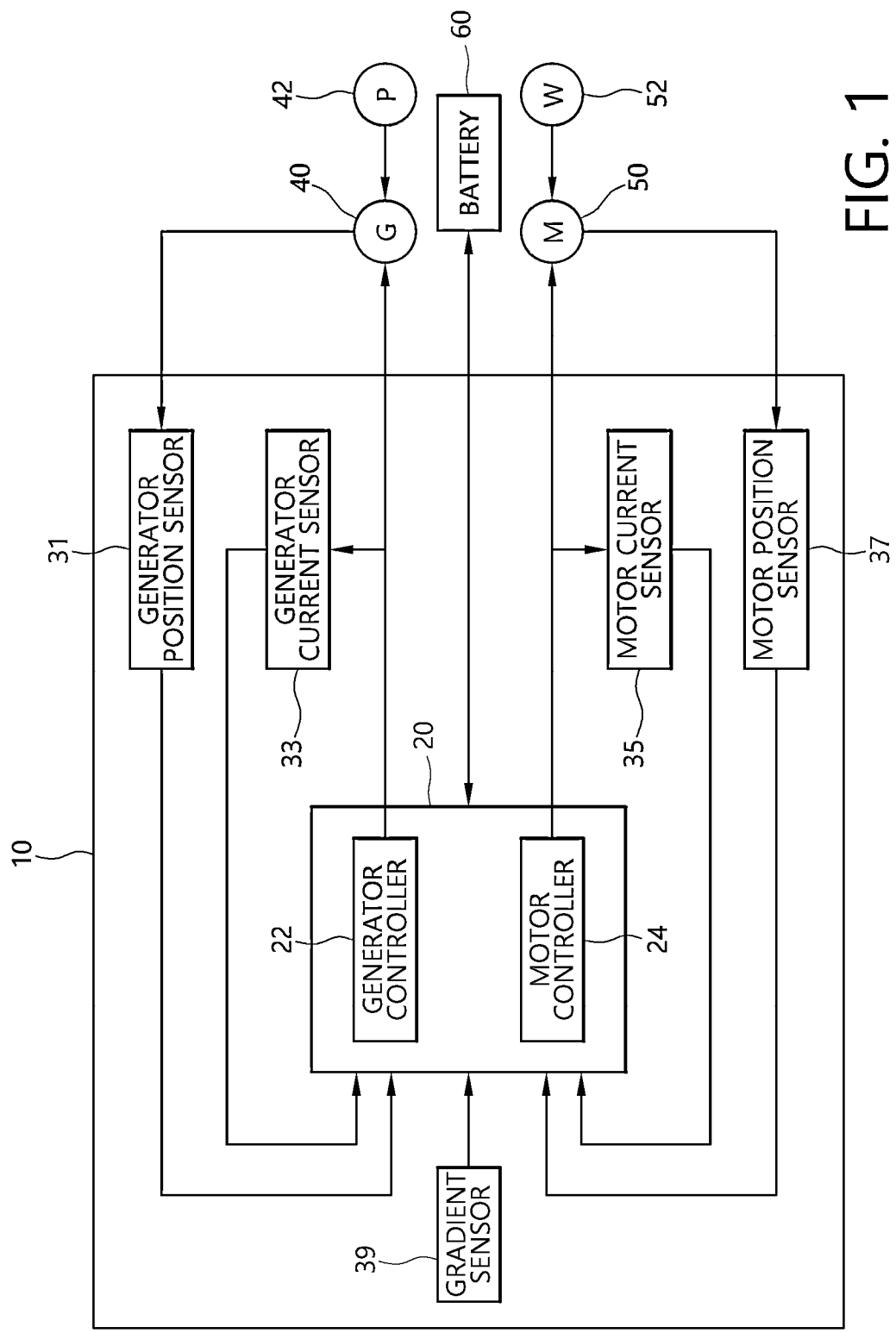
FIG. 1 illustrates a schematic structure of a device for driving a chainless electric bicycle according to an embodiment of the present invention.

FIG. 1 illustrates a structure of a system for driving a chainless electric bicycle according to an embodiment of the present invention.

A device 10 for driving a chainless electric bicycle according to the embodiment of the present invention includes a controller 20, a generator position sensor 31, a generator current sensor 33, a motor current sensor 35, and a motor position sensor 37 to control a generator 40 and a motor 50. When a user presses a pedal 42, the generator 40 converts a pedaling force into electricity and stores the electricity in a battery 60, and the motor 50 is driven by the electricity stored in the battery 60 so that a wheel 52 connected to the motor 50 is driven.

The controller 20 includes a generator controller 22, a motor controller 24, and one or more processors or microcontroller units (MCUs).

The generator 40 is mechanically connected to the pedal 42. Therefore, a rotational position of the pedal 42 is synchronized with a rotational position of the generator 40, and the rotational position of the pedal 42 may be measured by measuring a rotational position $P_P$ ($P_P$ also denotes a rotational position of the pedal because the generator and the pedal are mechanically connected. Hereinafter, all physical values for the rotation of the generator also refer to a corresponding physical value for the rotation of the pedal) of the generator 40 by the generator position sensor 31. $P_P$ may be expressed as a value of an angle. In the overall driving of the device 10 for driving the chainless electric bicycle for the purpose of synchronizing the rotational position $P_P$ of the pedal 42 and a rotational position $P_M$ of a driving wheel 52, $P_P$ is used as a reference value. The generator position sensor 31 transmits a value of the rotational position $P_P$ to the controller 20.

The motor 50 is mechanically connected to the driving wheel 52. Therefore, a rotational position of the driving wheel 52 is synchronized with a rotational position of the motor 50, and a rotational position of the driving wheel 52 may be measured by measuring the rotational position $P_M$ ($P_M$ also denotes a rotational position of the driving wheel because the motor and the driving wheel are mechanically connected. Hereinafter, all physical values for the rotation of the motor also refer to a corresponding physical value for the rotation of the driving wheel) of the motor 50 by the motor position sensor 37. $P_M$ may be expressed as a value of an angle. In the overall driving of the device 10 for driving the chainless electric bicycle for the purpose of synchronizing the rotational position $P_P$ of the pedal 42 and the rotational position $P_M$ of the driving wheel 52, $P_M$ is used as a feedback value. The motor position sensor 37 transmits a value of the rotational position $P_M$ to the controller 20.

The generator position sensor 31, the generator current sensor 33, the motor position sensor 37, and the motor current sensor 35 are all electrically connected to the controller 20. The generator position sensor 31 measures the rotational position $P_P$ of the generator 40, the generator current sensor 33 measures a generator driving current $I_{P\_current}$, the motor position sensor 37 measures the rotational position $P_M$ of the motor 50, and the motor current sensor 35 measures a motor driving current $I_{M\_current}$. Values that are measured by the generator position sensor 31, the generator current sensor 33, the motor position sensor 37, and the motor current sensor 35 are transmitted to the controller 20 and are used to control the generator 40 or the motor 50 using the controller 20.

Preferably, in order to additionally control the motor, the device 10 for driving the chainless electric bicycle may further include a gradient sensor 39, and the gradient sensor 39 may also be electrically connected to the controller 20. The gradient sensor 39 may include at least one of a gyro sensor, an acceleration sensor, and a geomagnetic sensor to measure a gradient of a road surface on which the electric bicycle travels. The gradient sensor 39 measures a gradient $S_S$ of the road surface and transmits a value of the gradient $S_S$ to the controller 20. The transmitted value of the gradient $S_S$ is used when additionally controlling the motor 50 in addition to the control of the motor 50 based on $P_P$ and $P_M$.

The controller 20 controls the generator 40 and the motor 50 on the basis of the rotational position $P_P$ of the generator 40 which is measured by the generator position sensor 31, the generator driving current $I_{P\_current}$ which is measured by the generator current sensor 33, the rotational position $P_M$ of the motor 50 which is measured by the motor position sensor 37, and the motor driving current $I_{M\_current}$ which is measured by the motor current sensor 35. The control of the generator 40 and the control of the motor 50 by the controller 20 mean the control of the generator driving current $I_{P\_current}$ and the control of the motor driving current $I_{M\_current}$ and, as a result, mean the control of the driving of the generator 40 and the control of the driving of the motor 50. The control of the driving of the generator 40 and the control of the driving of the motor 50 by the controller 20 are performed independently.

Further, the controller 20 may additionally control the motor 50 to be driven on the basis of the gradient $S_S$ of the road surface which is measured by the gradient sensor 39.

The controller 20 may also be referred to as a controller, a microcontroller, a microprocessor, a microcomputer, or the like. Meanwhile, the controller 20 may be implemented by hardware, firmware, software, or a combination thereof.

When the embodiment of the present invention is implemented by hardware, application-specific integrated circuits (ASICs), digital signal processors (DSPs), digital signal processing devices (DSPDs), programmable logic devices (PLDs), field programmable-gate arrays (FPGAs), or the like may be provided in the controller 20.

The generator controller 22 and the motor controller 24 in the controller 20 control the generator driving current $I_{P\_current}$ between the battery 60 and the generator 40 and the motor driving current $I_{M\_current}$ between the battery 60 and the motor 50, respectively. A generator driver and a motor driver may be implemented with a field effect transistor (FET).

When the electric bicycle is driven, the generator driving current $I_{P\_current}$ and the motor driving current $I_{M\_current}$ may each flow from the battery 60 toward the generator 40 and the motor 50, but when the electric bicycle performs regenerative braking, the generator driving current $I_{P\_current}$ and the motor driving current $I_{M\_current}$ may each flow from the generator 40 and the motor 50 toward the battery 60. That is, the generator driving current $I_{P\_current}$ and the motor driving current $I_{M\_current}$ may flow bidirectionally. The generator driving current $I_{P\_current}$ and the motor driving current $I_{M\_current}$ are measured by the generator current sensor 33 and the motor current sensor 35, respectively. The measured generator driving current $I_{P\_current}$ and the measured motor driving current $I_{M\_current}$ are transmitted to the controller 20 as a feedback value for generator current control and a feedback value for motor current control, respectively.

Figure 2:
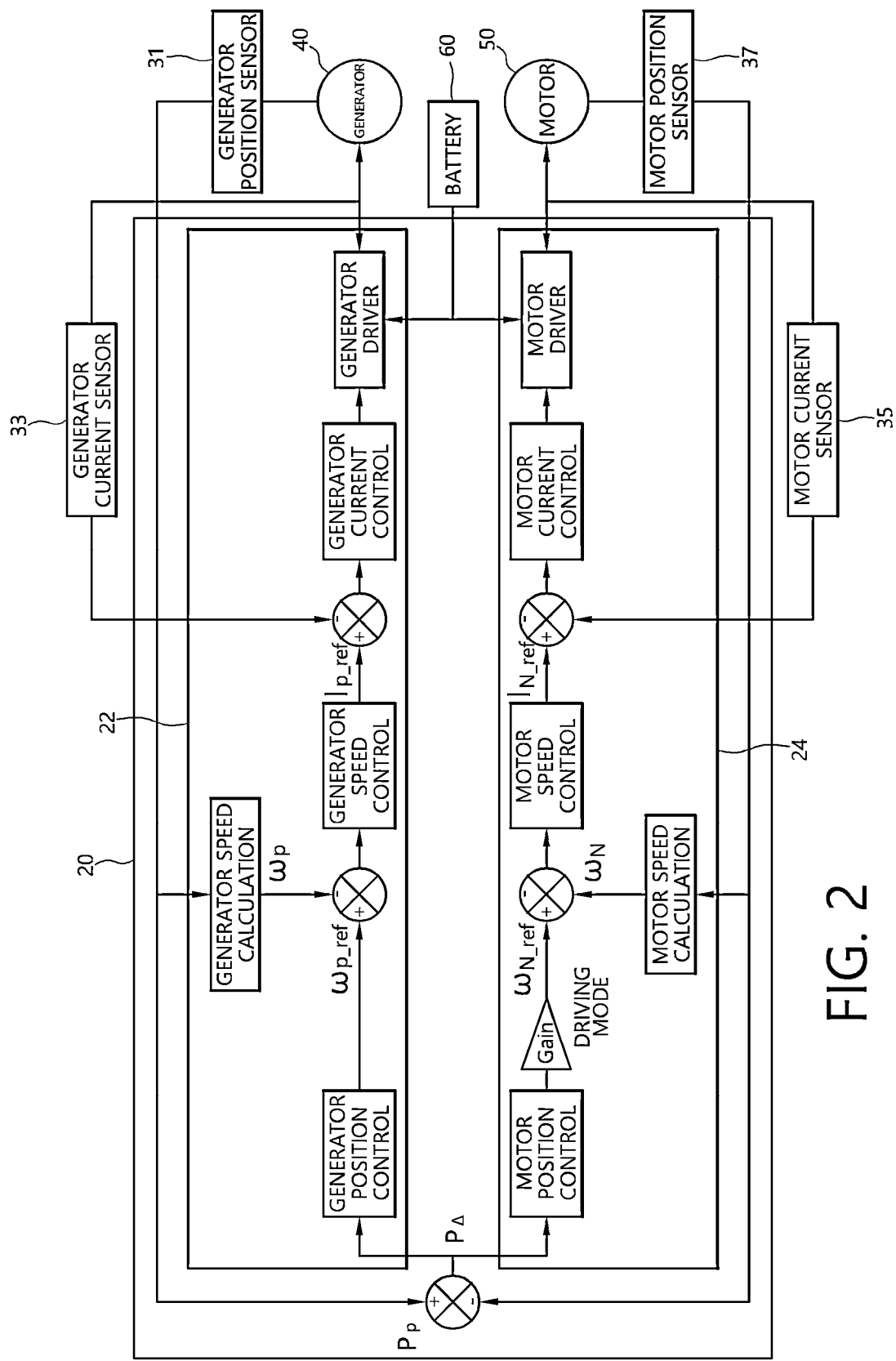
FIG. 2 illustrates a structure of a controller for driving a chainless electric bicycle according to an embodiment of the present invention.

FIG. 2 illustrates, in more detail, a structure of the controller 20 for driving the chainless electric bicycle according to the embodiment of the present invention.

The controller 20 receives the rotational position $P_P$ of the generator which is measured by the generator position sensor 31 and the rotational position $P_M$ of the motor which is measured by the motor position sensor 37, and then calculates a difference value $P_A$ obtained by subtracting $P_{M\_geared}$, which is the product of the value of the rotational position $P_M$ and a gear ratio $G_R$, from the value of the rotational position $P_P$. The gear ratio $G_R$ is a value that may be adjusted by an occupant, and in the case of a bicycle with a chain, $P_{M\_geared}$, which is the product of $P_M$ and GR, is physically identical to $P_P$. That is, a difference value $P_A$ in the bicycle with a chain is zero. Therefore, in order for the user to feel a pedaling feeling for the electric bicycle as in the bicycle with a chain, $P_A$ should be set to zero. When $P_A$ becomes zero, the rotation of the pedal and the rotation of the driving wheel are synchronized.

According to an embodiment of the present invention, after the difference value $P_A$ of $P_P$ and $P_{M\_geared}$ is commonly calculated by the controller 20, the control of the generator 40 and the control of the motor 50 are independently performed by the controller 20. The control of the generator 40 by the controller 20 is performed by the operation of the generator driver through generator position control, generator speed control, and generator current control by the controller 20. Further, the control of the motor 50 by the controller 20 is performed by the operation of the motor driver through motor position control, motor speed control, and motor current control by the controller 20.

The controller 20 controls the generator 40 and the motor 50 so that the occupant of the electric bicycle feels the pedaling feeling to be heavier, lighter, or the same as before, depending on whether $P_A$ is a positive number, a negative number, or zero.

First, when $P_A$ is a positive number, that is, when the rotational position $P_P$ of the generator is greater than $P_{M\_geared}$, which is the product of the rotational position $P_M$ of the motor and the gear ratio $G_R$, the generator 40 is relatively ahead of the motor 50 in rotational position and the motor 50 is behind the generator 40. Therefore, in order to adjust $P_A$ to zero, the generator 40 and the motor 50 should be controlled so that the occupant feels the pedaling feeling heavy.

To this end, until $P_A$ becomes zero, the counter torque with respect to a driving direction of the generator 40 should be increased so that a driving torque of the motor 50 is increased or the motor 50 follows the rotation of the generator 40. Therefore, until $P_A$ becomes zero, the controller 20 should control at least one of the generator 40 and the motor 50 by increasing the generator driving current $I_{P\_current}$ or the motor driving current $I_{M\_current}$.

When $P_A$ is the positive number, the control of the generator 40 is performed by the operation of the generator driver through the generator position control, the generator speed control, and the generator current control by the controller 20. In the generator position control, the controller 20 increases a target generator speed $\omega_{P\_ref}$ on the basis of $P_A$ and outputs the increased target generator speed $\omega_{P\_ref}$. Next, in the generator speed control, the controller 20 increases a target generator current $I_{P\_ref}$ using the increased target generator speed $\omega_{P\_ref}$ as a reference value and using a generator rotation speed $\omega_P$ calculated by differentiating the rotational position $P_P$ of the generator as a feedback value, and outputs the increased target generator current $I_{P\_ref}$. Next, in the generator current control, the controller 20 controls the generator driver so that the generator driving current $I_{P\_current}$ is increased using the increased target generator current $I_{P\_ref}$ as a reference value and using the generator driving current $I_{P\_current}$ which is measured and transmitted by the generator current sensor 33 as a feedback value. The generator driver controls the generator 40 so that a counter torque is increased by increasing the generator driving current $I_{P\_current}$ between the battery 60 and the generator 40 according to the generator current control.

When $P_A$ is the positive number, the control of the motor 50 is performed by the operation of the motor driver through the motor position control, the motor speed control, and the motor current control by the controller 20. The controller 20 increases a target motor speed $\omega_{M\_ref}$ on the basis of $P_A$ in the motor position control and outputs the increased target motor speed $\omega_{M\_ref}$. A gain may be applied to the target motor speed $\omega_{M\_ref}$ according to the user's driving mode setting. The driving mode means that the user manually sets how heavy the default pedaling feeling is. Therefore, the target motor speed $\omega_{M\_ref}$ that is increased and output based on $P_A$ is input to the motor speed control after the gain is applied according to the driving mode setting. Next, in the motor speed control, the controller 20 increases a target motor current $I_{M\_ref}$ using the increased target motor speed $\omega_{M\_ref}$ as a reference value and using the motor rotation speed $\omega_M$ calculated by differentiating the rotational position $P_P$ of the motor of the motor as a feedback value, and outputs the increased target motor current $I_{M\_ref}$. Next, in the motor current control, the controller 20 controls the motor driver so that the motor driving current $I_{M\_current}$ is increased using the increased target motor current $I_{M\_ref}$ as a reference value and using the motor driving current $I_{M\_current}$ which is measured and transmitted by the motor current sensor 35 as a feedback value. The motor driver controls the motor 50 so that a torque is increased by increasing the motor driving current $I_{M\_current}$ between the battery 60 and the motor 50 according to the motor current control.

Further, when $P_A$ is a negative number, that is, when the rotational position $P_P$ of the generator is smaller than $P_{M\_geared}$, which is the product of the rotational position $P_M$ of the motor and the gear ratio $G_R$, the generator 40 is relatively behind the motor 50 in the rotational position and the motor 50 is ahead of the generator 40. Therefore, in order to adjust $P_A$ to zero, the generator 40 and the motor 50 should be controlled so that the occupant feels the pedaling feeling light. To this end, until $P_A$ becomes zero, the counter torque with respect to the driving direction of the generator 40 should be reduced so that the driving torque of the motor 50 is reduced or the motor 50 follows the rotation of the generator 40. Therefore, until $P_A$ becomes zero, the controller 20 should control the generator 40 or the motor 50 by reducing the generator driving current $I_{P\_current}$ or the motor driving current $I_{M\_current}$.

When $P_A$ is the negative number, the control of the generator 40 is performed by the operation of the generator driver through the generator position control, the generator speed control, and the generator current control by the controller 20. In the generator position control, the controller 20 reduces the target generator speed $\omega_{P\_ref}$ on the basis of $P_A$ and outputs the reduced target generator speed $\omega_{P\_ref}$. Next, in the generator speed control, the controller 20 reduces the target generator current $I_{P\_ref}$ using the reduced target generator speed $\omega_{P\_ref}$ as the reference value and using the generator rotation speed $\omega_P$ calculated by differentiating the rotational position $P_P$ of the generator as the feedback value, and outputs the target generator current $I_{P\_ref}$. However, a minimum value of the target generator current $I_{P\_ref}$ cannot be less than zero. That is, the pedaling feeling cannot be reduced by rotating (when the target generator current $I_{P\_ref}$<0) the pedal through the generator faster than the speed of the pedal that the occupant presses the pedal in the direction in which the pedal rotates. Next, in the generator current control, the controller 20 controls the generator driver so that the generator driving current $I_{P\_current}$ is reduced using the reduced target generator current $I_{P\_ref}$ as the reference value and using the generator driving current $I_{P\_current}$ which is measured and transmitted by the generator current sensor 33 as the feedback value. The generator driver controls the generator 40 so that the counter torque is reduced by reducing the generator driving current $I_{P\_current}$ between the battery 60 and the generator 40 according to the generator current.

When $P_A$ is the negative number, the control of the motor 50 is performed by the operation of the motor driver through the motor position control, the motor speed control, and the motor current control by the controller 20. The controller 20 reduces the target motor speed $\omega_{M\_ref}$ on the basis of $P_A$ in the motor position control and outputs the reduced target motor speed $\omega_{M\_ref}$. As described above, the target motor speed $\omega_{M\_ref}$ that is reduced and output based on $P_A$ is input to the motor speed control after the gain is applied according to the driving mode setting. Next, in the motor speed control, the controller 20 reduces the target motor current $I_{M\_ref}$ using the reduced target motor speed $\omega_{M\_ref}$ as the reference value and using the motor rotation speed $\omega_M$ calculated by differentiating the rotational position $P_P$ of the motor as the feedback value and outputs the reduced target motor current $I_{M\_ref}$. Next, in the motor current control, the controller 20 controls the motor driver so that the motor driving current $I_{M\_current}$ is reduced using the reduced target motor current $I_{M\_ref}$ as the reference value and using the motor driving current $I_{M\_current}$ which is measured and transmitted by the motor current sensor 35 as the feedback value. The motor driver controls the motor 50 so that the torque is reduced by reducing the motor driving current $I_{M\_current}$ between the battery 60 and the motor 50 according to the motor current control.

Further, when $P_A$ is zero, that is, when the rotational position $P_P$ of the generator is equal to $P_{M\_geared}$, which is the product of the rotational position $P_M$ of the motor and the gear ratio $G_R$, the generator 40 and the motor 50 are synchronized in the rotational position. Therefore, in order to adjust $P_A$ to zero, the generator 40 and the motor 50 should be controlled so that the occupant maintains and feels the pedaling feeling. To this end, until $P_A$ becomes zero, the counter torque with respect to the driving direction of the generator 40 should be maintained, and the driving torque of the motor 50 should be maintained so that the motor 50 follows the rotation of the generator 40. Therefore, in order to maintain $P_A$ at zero, the controller 20 should control the generator 40 and the motor 50 so that the generator driving current $I_{P\_current}$ and the motor driving current $I_M$ current are maintained in current states.

When $P_A$ is zero, the control of the generator 40 is performed by the operation of the generator driver through the generator position control, the generator speed control, and the generator current control by the controller 20. In the generator position control, the controller 20 maintains and outputs the target generator speed WP ref on the basis of $P_A$. Next, in the generator speed control, the controller 20 maintains and outputs the target generator current $I_{P\_ref}$ using the maintained target generator speed $\omega_{P\_ref}$ as the reference value and using the generator rotation speed $\omega_P$ calculated by differentiating the rotational position $P_P$ of the generator as the feedback value. Next, in the generator current control, the controller 20 controls the generator driver so that the generator driving current $I_{P\_current}$ is maintained using the maintained target generator current $I_{P\_ref}$ as the reference value and using the generator driving current $I_{P\_current}$ which is measured and transmitted by the generator current sensor 33 as the feedback value. The generator driver controls the generator 40 so that the counter torque is maintained by maintaining the generator driving current $I_{P\_current}$ between the battery 60 and the generator 40 according to the generator current control.

When $P_A$ is zero, the control of the motor 50 is performed by the operation of the motor driver through the motor position control, the motor speed control, and the motor current control by the controller 20. In the motor position control, the controller 20 maintains and outputs the target motor speed $\omega_{M\_ref}$ on the basis of $P_A$. As described above, the target motor speed $\omega_{M\_ref}$ that is maintained and output based on $P_A$ is input to the motor speed control after the gain is applied according to the driving mode setting. Next, in the motor speed control, the controller 20 maintains and outputs the target motor current $I_{M\_ref}$ using the maintained target motor speed $\omega_M$ ref as the reference value and using the motor rotation speed ωm calculated by differentiating the rotational position $P_P$ of the motor as the feedback value. Next, in the motor current control, the controller 20 controls the motor driver so that the motor driving current $I_{M\_current}$ is maintained using the maintained target motor current $I_M$ ref as the reference value and using the motor driving current $I_{M\_current}$ measured and transmitted by the motor current sensor 35 as the feedback value. The motor driver controls the motor 50 so that the torque is maintained by maintaining the motor driving current $I_{M\_current}$ between the battery 60 and the motor 50 according to the motor current control.

As a result of the driving control for at least one of the generator 40 and the motor 50 of the controller 20, the rotational position $P_M$ of the motor 50 is synchronized with the rotational position $P_P$ of the generator 40. That is, in terms of overall control of the device 10 for driving the chainless electric bicycle, the rotational position $P_P$ of the generator 40 is used as the reference value and the rotational position $P_M$ of the motor 50 is used as the feedback value.

The rotational position of the driving wheel 52 and the rotational position of the pedal 42 may be synchronized by the driving control of at least one of the generator 40 and the motor 50, and as a result, the pedaling feeling that the occupant of the electric bicycle feels may become similar to a real bicycle.

Figure 3:
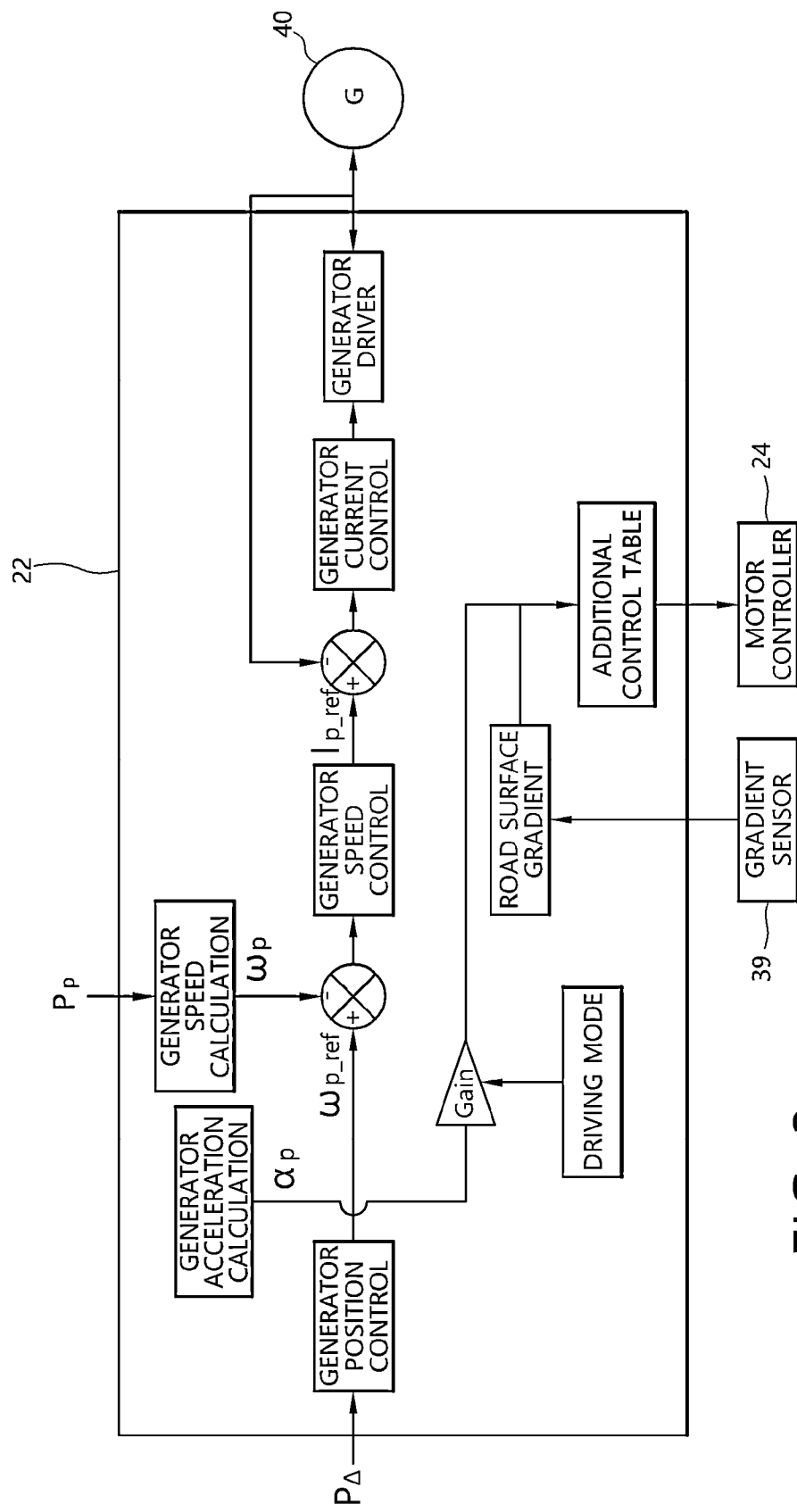
FIG. 3 illustrates a structure of a generator controller of a chainless electric bicycle according to an embodiment of the present invention.

FIG. 3 illustrates a structure of the generator controller 22 for additional motor control according to another embodiment of the present invention.

When a pedal acceleration increases or a gradient of a road surface increases, it is difficult for the motor 50 to follow the rotation of the generator 40 because a rotation speed of the generator 40 increases rapidly, and thus an additional target motor current $I_{A\_ref}$ may be input to the motor current control in an overlapping manner with the target motor current $I_{M\_ref}$ to be used as a reference value in an overlapping manner. The gradient of the road surface may be obtained from the gradient sensor 39. That is, the additional motor control using the additional target motor current $I_{A\_ref}$ may be performed on the motor 50 in an overlapping manner. However, a minimum value of the additional target motor current $I_{A\_ref}$ cannot be less than zero.

In order to enable the rotation of the motor 50 to rapidly follow the rotation of the generator 40, the additional motor control may be performed to further increase the driving torque of the motor 50. When the rotational position of the generator 40 is rapidly changed because the gradient of the road surface is large or the rotational acceleration of the pedal 42 is large, the rotational position control of the motor 50 by the electronic control cannot follow the rotational position of the generator 40, and thus the additional motor control is performed.

A generator rotational acceleration $\alpha_P$ is calculated by differentiating the generator rotation speed $\omega_P$ again which is calculated through differentiation from the rotational position $P_P$ of the generator, a gradient $S_S$ of the road surface is measured by the gradient sensor 39, and then the generator rotational acceleration $\alpha_P$ and the gradient $S_S$ of the road surface is input to a predetermined additional control table to generate an additional target motor current $I_{A\_ref}$, and thus the additional motor control is performed by the generator controller 22. Preferably, the generator rotational acceleration $\alpha_P$ may be input to the table after a gain is applied according to a driving mode set by the user.

As the generator rotational acceleration $\alpha_P$ increases and the gradient $S_S$ of the road surface increases, a larger additional motor current command $I_{A\_ref}$ may be generated. Preferably, when the generator rotational acceleration $\alpha_P$ is greater than or equal to a predetermined acceleration or the gradient of the road surface is greater than or equal to a predetermined gradient, the additional motor current command $I_{A\_ref}$ may be generated. However, a minimum value of the additional target motor current $I_{A\_ref}$ cannot be less than zero.

The additional target motor current $I_{A\_ref}$ is used as a reference value for motor current control of the motor controller 24 in an overlapping manner with the target motor current $I_{M\_ref}$. By the additional motor control, a larger motor driving current $I_{M\_current}$ may be provided to the motor 50 and a driving torque of the motor 50 may be additionally increased. As a result, the motor 50 rotates more and thus may rapidly follow a position change caused by the rapid rotation of the generator 40.

Figure 4:
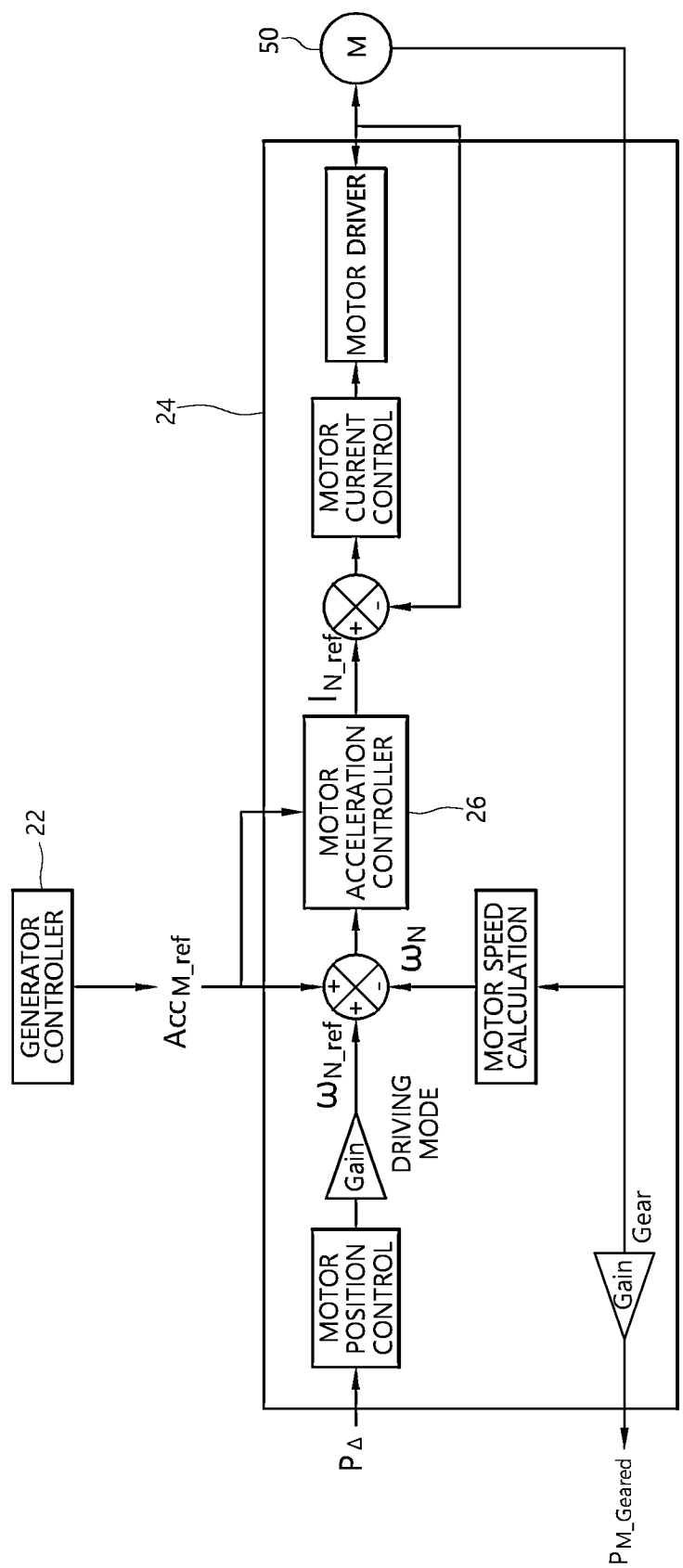
FIG. 4 illustrates a structure of a motor controller of a chainless electric bicycle according to an embodiment of the present invention.

FIG. 4 illustrates a structure of the motor controller 24 according to another embodiment of the present invention.

The motor controller 24 may further include a motor acceleration controller 26 to control the acceleration of the motor 50. That is, the motor 50 is driven by controlling an acceleration of the motor rather than a speed of the motor.

The motor controller 24 receives a motor acceleration command value $Acc_{M\_ref}$ calculated using the user's pedal torque, and the motor acceleration controller calculates a motor acceleration $Acc_M$ from a rotational position $P_M$ of the motor. Based on the above two values, the motor acceleration controller 26 controls the acceleration of the motor.

Figure 5:
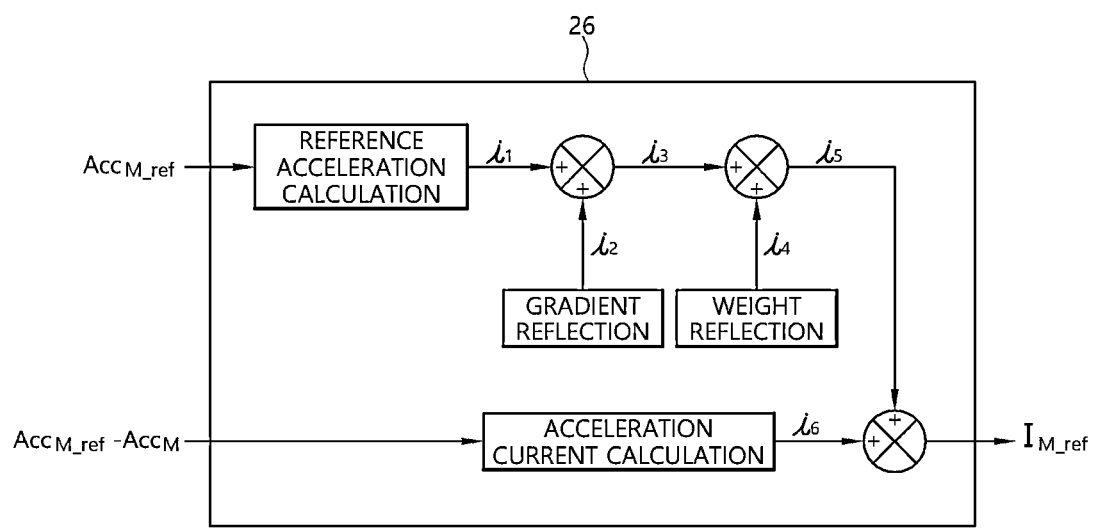
FIG. 5 illustrates a more detailed structure of a motor acceleration controller according to an embodiment of the present invention.

FIG. 5 illustrates a more detailed structure of the motor acceleration controller 26 according to another embodiment of the present invention.

The motor acceleration controller 26 receives a motor acceleration reference value $Acc_{M\_ref}$ calculated using a pedal torque and generates a current $i_1$ on the basis of a reference acceleration. The reference acceleration is calculated by calculating a motor control current according to an acceleration assuming that a weight on the bicycle is an average weight on a flat ground with a gradient of 0%.

Next, an additional current $i_2$ is generated by reflecting the gradient measured by the gradient sensor and a current $i_3$ is generated by adding the additional current $i_2$ to the reference current $i_1$. As the gradient is increased, more additional current is required, and thus the additional current should be generated.

When there is a weight sensor, an additional current $i_4$ is generated by reflecting the weight and a current $i_5$ is generated by adding the additional current $i_4$ to the current command.

Meanwhile, a motor acceleration $Acc_M$ calculated using a motor rotation speed $RP_M$ is used as a feedback to control the motor acceleration reference value $Acc_{M\_ref}$ calculated using the pedal torque, and a motor acceleration current $i_6$ is generated so that the target motor acceleration $Acc_{M\_ref}$ and the actual motor acceleration $Acc_M$ become identical.

Finally, $I_{M\_ref}$, which is a motor acceleration command current, is generated by adding the current $i_6$ generated using the target motor acceleration and the current $i_5$ to which the gradient and the weight are applied to drive the motor.

As described above, since the motor acceleration command instead of the motor torque command or the motor speed command is used for motor control, the acceleration of the motor 50 may be adjusted. As a result, variation of the acceleration may be reduced, and thus a more improved pedaling feeling and driving feeling may be realized.

Meanwhile, in the case in which the motor speed command is used for motor control, the motor speed command is changed with time. Therefore, when a bandwidth of a speed controller is not large enough, an output may be unstable. However, since the motor acceleration command has a constant value corresponding to the pedal torque, the output may be relatively stable.

A magnitude of the current, which is supplied to the motor, of the speed controller may be greater than that of the acceleration controller. Even when a command value is given to exhibit the same acceleration performance, a maximum current appears in different aspects according to a control method. In the case in which the acceleration controller is used, it is possible to control the speed only with a smaller current.

Further, when the motor is accelerated using the acceleration controller, less current than that of the conventional speed controller is supplied to the motor, and thus it is possible to improve thermal characteristics and reduce a size of a hardware system.

Figure 6:
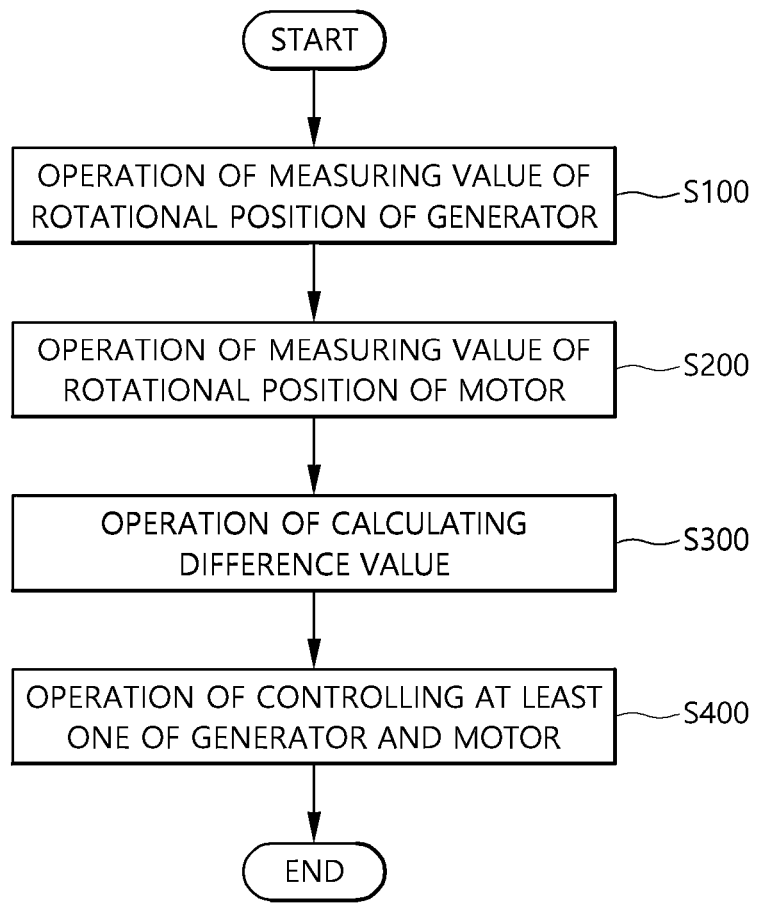
FIG. 6 is a flowchart illustrating a method of driving a chainless electric bicycle according to an embodiment of the present invention.

FIG. 6 is a flowchart illustrating a method of driving a chainless electric bicycle according to an embodiment of the present invention.

According to an embodiment of the present invention, a method of driving a chainless electric bicycle, which is performed by a driving device including a controller, includes an operation S100 of receiving a measured value of a rotational position $P_P$ of a generator 40, an operation S200 of receiving a measured value of a rotational position $P_M$ of a motor 50, an operation S300 of calculating a difference value $P_A$ obtained by subtracting a value $P_{M\_geared}$ obtained by multiplying the value of the rotational position $P_M$ of the motor 50 by a gear ratio from the value of the rotational position $P_P$ of the generator 40, and an operation S400 of controlling the generator 40 or the motor 50 on the basis of the difference value $P_A$.

Figure 7:
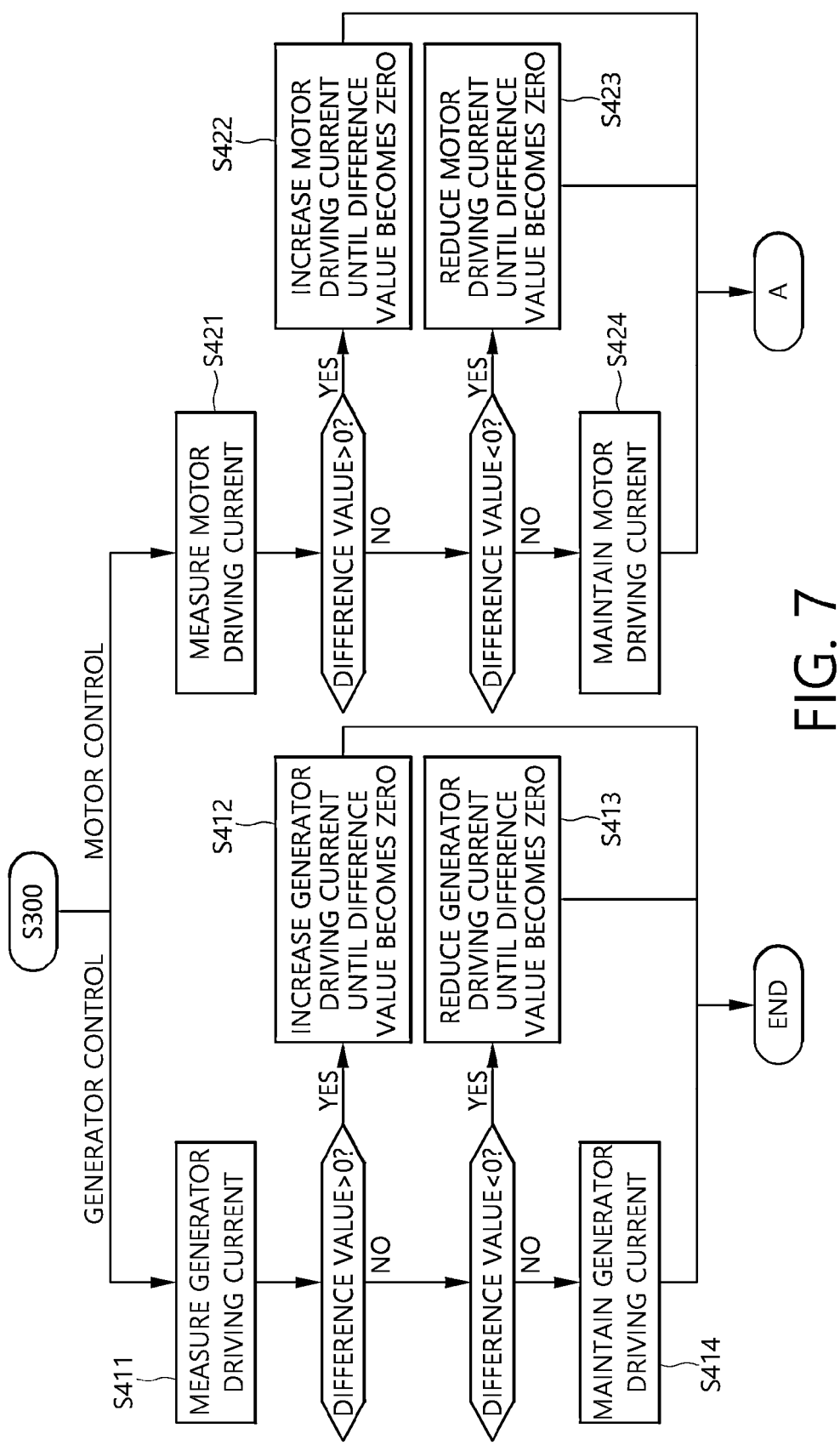
FIG. 7 is a flowchart illustrating a method of controlling a generator or a motor of a chainless electric bicycle according to an embodiment of the present invention.

FIG. 7 is a flowchart illustrating the operation of controlling the generator 40 or the motor 50 according to the embodiment of the present invention.

Referring to FIG. 7, after the operation S300 of calculating the difference value is performed, the operation S400 of controlling at least one of the generator 40 and the motor 50 may include at least one of operations S412 to S414 of controlling the generator 40 by controlling a generator driving current $I_{P\_current}$ between a battery and the generator 40 and at least one of operations S422 to S424 of controlling the motor 50 by controlling a motor driving current $I_{M\_current}$ between the battery and the motor 50. The operations S412 to S414 of controlling the generator 40 and the operations S422 to S424 of controlling the motor 50 may be performed independently of each other.

The method of driving the chainless electric bicycle according to the embodiment of the present invention may further include an operation S411 of measuring the generator driving current $I_{P\_current}$ and an operation S421 of measuring the motor driving current $I_{M\_current}$. The control of the generator driving current $I_{P\_current}$ (S412 to S414) may be performed using a target generator current $I_{P\_ref}$ generated based on the difference value $P_A$ as a reference value and using the measured generator driving current $I_{P\_current}$ as a feedback value. The control of the motor driving current $I_{M\_current}$ (S422 to S424) may be performed using a target motor current $I_{M\_ref}$ generated based on the difference value $P_A$ as a reference value and using the measured motor driving current $I_{M\_current}$ as a feedback value.

Further, the operations S412 to S414 of controlling the generator 40 may include the operation S412 of controlling the generator 40 by increasing the generator driving current $I_{P\_current}$ until the difference value $P_A$ becomes zero when the difference value $P_A$ is a positive number, the operation S413 of controlling the generator 40 by reducing the generator driving current $I_{P\_current}$ until the difference value $P_A$ becomes zero when the difference value $P_A$ is a negative number, or the operation S414 of controlling the generator 40 by maintaining the generator driving current $I_{P\_current}$ when the difference value $P_A$ is zero. The control of the generator 40 may be completed by performing the operations S412 to S414 of controlling the generator 40.

Further, the operations S422 to S424 of controlling the motor 50 may include the operation S422 of controlling the motor 50 by increasing the motor driving current $I_M$ current until the difference value $P_A$ becomes zero when the difference value $P_A$ is a positive number, the operation S423 of controlling the motor by reducing the motor driving current $I_{M\_current}$ until the difference value $P_A$ becomes zero when the difference value $P_A$ is a negative number, or the operation S424 of controlling the motor 50 by maintaining the motor driving current $I_{M\_current}$ when the difference value $P_A$ is zero. The control of the motor 50 may be completed by performing the operations S422 to S424 of controlling the motor 50 or may be completed after additional operations S425 to S427 of controlling the motor 50 are further performed.

Figure 8:
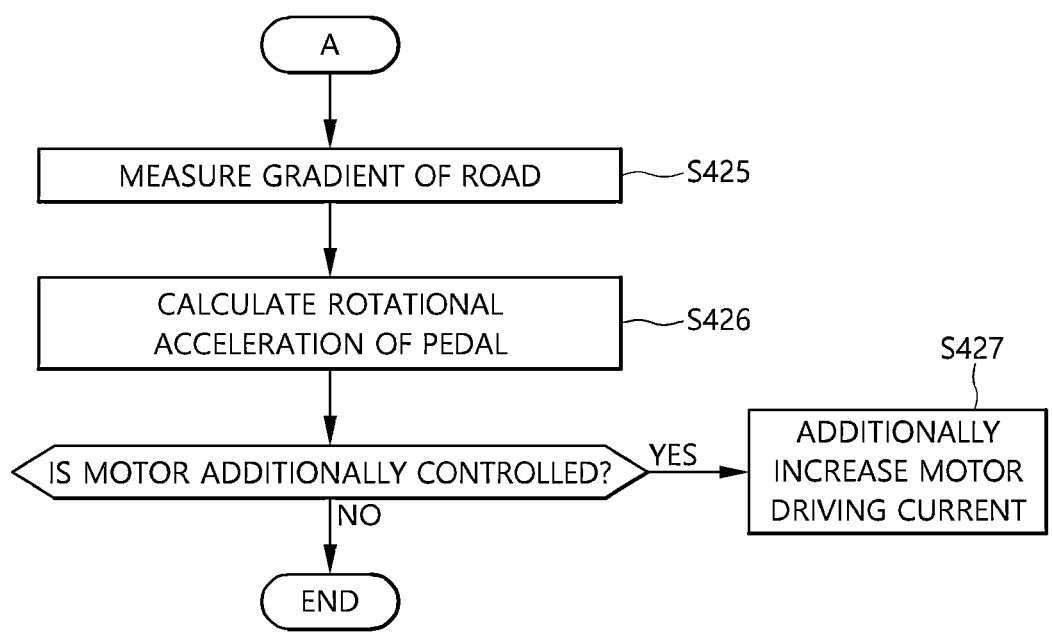
FIG. 8 is an additional flowchart illustrating a method of controlling a motor according to an embodiment of the present invention.

FIG. 8 is a flowchart illustrating a method of additionally controlling the motor 50 according to an embodiment of the present invention.

The method of driving the chainless electric bicycle according to the embodiment of the present invention may further include the operation S425 of measuring a gradient $S_S$ of a road on which the electric bicycle travels, the operation S426 of calculating a pedal rotational acceleration $\alpha_P$ using a rotational position $P_P$ of the generator 40, and the operation S427 of additionally controlling the motor 50 on the basis of the gradient $S_S$ of the road and the pedal rotational acceleration $\alpha_P$.

Further, the operation S427 of additionally controlling the motor 50 may be performed by additionally increasing the motor driving current $I_{M\_current}$ when the gradient $S_S$ of the road is greater than or equal to a predetermined gradient or the pedal rotational acceleration $\alpha_P$ is greater than or equal to a predetermined acceleration.

As a result of the performing of driving control on at least one of the generator 40 and the motor 50 according to the method according to the embodiment of the present invention, a rotational position $P_M$ of the motor 50 is synchronized with the rotational position $P_P$ of the generator 40. That is, the rotational position $P_P$ of the generator 40 is used as a reference value and the rotational position $P_M$ of the motor 50 is used as a feedback value.

By the driving control for the generator 40 and the motor 50, the rotational position of the driving wheel and the rotational position of the pedal may be synchronized, and, as a result, a pedaling feeling that an occupant of the electric bicycle feels may become similar to that of a real bicycle.

Figure 9:
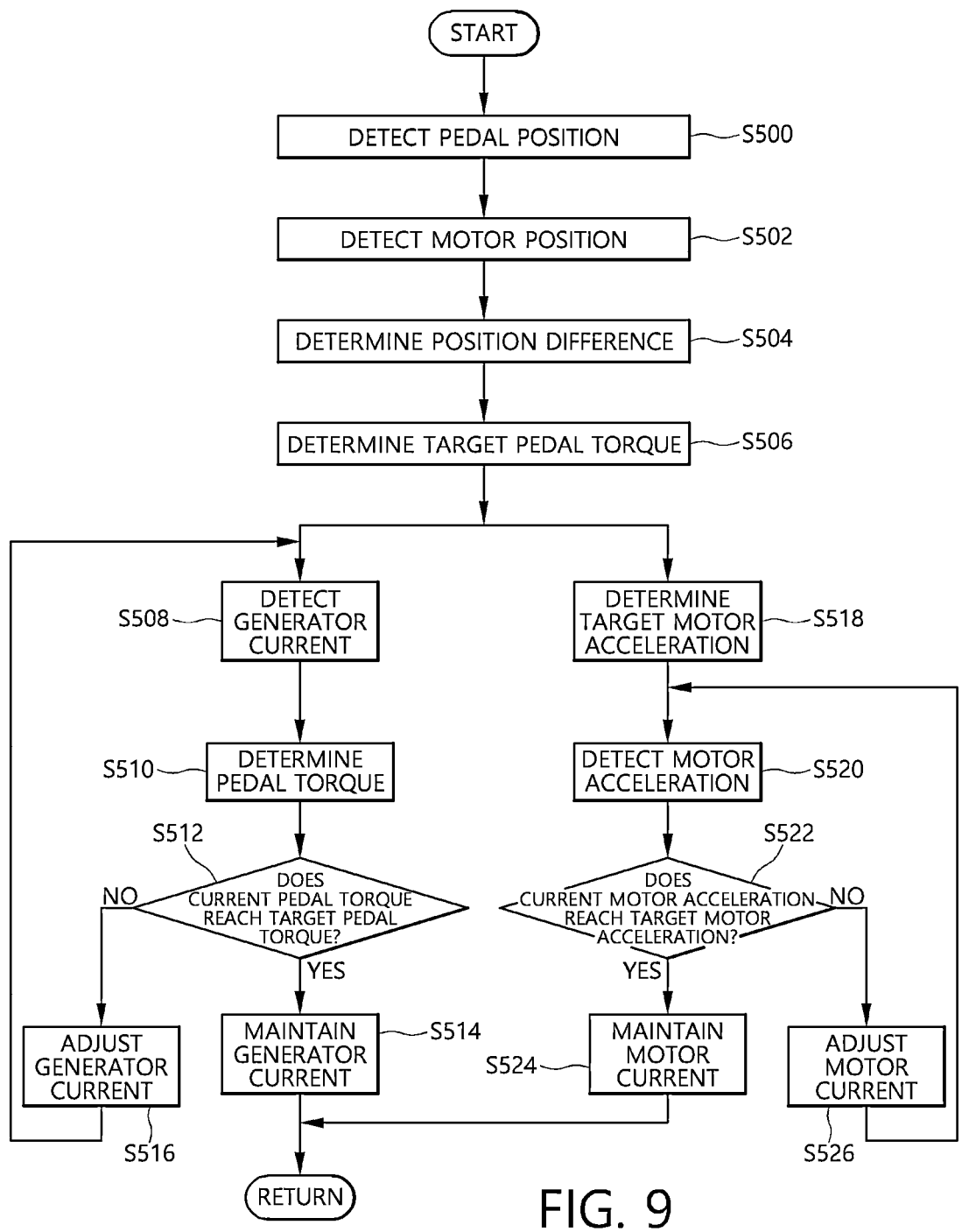
FIG. 9 is a control flowchart illustrating a device for driving an electric bicycle according to another embodiment of the present invention.

FIG. 9 is a control flowchart illustrating a device for driving an electric bicycle according to an embodiment of the present invention.

Referring to FIG. 9, a controller 20 may detect a position of the pedal 42 using a generator position sensor 31 (S500).

The controller 20 may detect a position of the motor 50 using a motor position sensor 37 (S502).

The controller 20 may determine a position difference between the detected position of the pedal and the detected position of the motor (S504).

The controller 20 may determine a target pedal torque on the basis of the position difference between the position of the pedal and the position of the motor (S504). The target pedal torque may be a torque that is preset to correspond to the position difference between the position of the pedal and the position of the motor.

The controller 20 may detect a current of the generator 40 using a generator current sensor 33 (S508).

The controller 20 may determine a pedal torque according to a generator current (S510). The pedal torque may be a torque that is preset to correspond to the current of the generator 40.

The controller 20 may determine whether a current pedal torque reaches the target pedal torque (S512).

As a result of the determination in operation S512, when it is determined that the current pedal torque reaches the target pedal torque, the controller 20 allows a current generator current to be maintained (S514).

Meanwhile, as the result of the determination in operation S512, when it is determined that the current pedal torque does not reach the target pedal torque, the controller 20 may adjust the current generator current (S516). Thereafter, the flow of the method may be moved to operation S508 to perform the subsequent operations.

Meanwhile, after the target pedal torque is determined in operation S506, the controller 20 may determine a target motor acceleration according to the target pedal torque (S518). The target motor acceleration may be a speed that is preset to correspond to the target pedal torque.

The controller 20 may detect a motor acceleration on the basis of the rotational position of the motor 50 which is detected using the motor position sensor 37 (S520). The controller 20 may determine a motor speed using a change in the rotational position of the motor which is detected using the motor position sensor 37 and may determine the motor acceleration using the motor speed.

The controller 20 may determine whether a current motor acceleration reaches a target motor acceleration (S522).

As a result of the determination in operation S522, when it is determined that the current motor acceleration reaches the target motor acceleration, the controller 20 allows a current motor current to be maintained (S524).

Meanwhile, as the result of the determination in operation S522, when it is determined that the current motor acceleration does not reach the target motor acceleration, the controller 20 may adjust the current motor current (S526). Thereafter, the flow of the method may be moved to operation S520 to perform the subsequent operations.

As described above, in an embodiment of the present invention, it is possible to more effectively improve a pedaling feeling and a driving feeling as if there is a real chain on the electric bicycle.

A device for driving an electric bicycle according to still another embodiment of the present invention may include a first motor driver and a second motor driver.

A controller may determine a target pedal torque on the basis of a position difference between an average position of a position of a first motor and a position of a second motor and a position of a pedal.

The controller may determine a target motor acceleration according to the target pedal torque and may adjust a current of the first motor using the first motor driver and adjust a current of the second motor using the second motor driver so that the motor acceleration reaches the target motor acceleration. In addition, the controller may adjust the current of the generator so that the pedal torque according to the generator current reaches the target pedal torque.

The same motor acceleration command may be used for motor control for the first motor and the second motor. Therefore, speed control of the first motor and the second motor may be performed at the same motor acceleration.

As described above, in another embodiment of the present invention, it is possible to more effectively improve the feeling of having a chain on the electric bicycle regardless of the driving road surface, and it is possible to perform the speed control at the same speed even when there is a difference in road surface condition between wheels on which the motor is mounted.

The scope of the present invention is not limited to the description and expression of the embodiments explicitly described above. In addition, it is added once again that the scope of the present invention cannot be limited due to obvious changes or substitutions in the art to which the present invention pertains.

The invention claimed is:

1. A device for driving a chainless electric bicycle, the device comprising:
   a motor configured to drive a driving wheel;
   a generator configured to generate power using a pedal;
   a generator position sensor configured to measure a value of a rotational position of the generator;
   a motor position sensor configured to measure a value of a rotational position of the motor; and
   a controller configured to calculate a difference value obtained by subtracting a value obtained by multiplying the value of the rotational position of the motor by a gear ratio from the value of the rotational position of the generator and control the generator or the motor on the basis of the difference value.

2. The device of claim 1, wherein the controller controls the generator or the motor so that the difference value becomes zero.

3. The device of claim 2, wherein, when the difference value is greater than zero, the controller controls the generator to increase a counter torque with respect to a driving direction of the generator or controls the motor to increase a driving torque of the motor, and when the difference value is smaller than zero, the controller controls the generator to reduce the counter torque with respect to the driving direction of the generator or controls the motor to reduce the driving torque of the motor.

4. The device of claim 1, further comprising:
a generator current sensor configured to measure a generator driving current between a battery and the generator; and
a motor current sensor configured to measure a motor driving current between the battery and the motor,
wherein the controller controls the generator by controlling the generator driving current using a target generator current generated based on the difference value as a reference value and using the measured generator driving current as a feedback value and controls the motor by controlling the motor driving current using a target motor current generated based on the difference value as a reference value and using the measured motor driving current as a feedback value.

5. The device of claim 4, wherein, when the difference value is greater than zero, the controller increases the generator driving current or increases the motor driving current, and when the difference value is smaller than zero, the controller reduces the generator driving current or reduces the motor driving current.

6. The device of claim 1, further comprising a gradient sensor configured to measure a gradient of a road on which the electric bicycle travels,
wherein the controller calculates a rotational acceleration of the pedal using the rotational position of the generator and further increases the motor driving current on the basis of a value of the gradient of the road, which is received from the gradient sensor, and the rotational acceleration of the pedal.

7. A method of driving a chainless electric bicycle, which is performed by a controller including one or more processors, the method comprising:
receiving a value of a rotational position of a generator from a generator position sensor;
receiving a value of a rotational position of a motor from a motor position sensor;
calculating a difference value obtained by subtracting a value obtained by multiplying the value of the rotational position of the motor by a gear ratio from the value of the rotational position of the generator; and
controlling the generator or the motor on the basis of the difference value.

8. The method of claim 7, wherein, in the controlling of the generator or the motor, the generator or the motor is controlled so that the difference value becomes zero.

9. The method of claim 8, wherein, in the controlling of the generator or the motor, when the difference value is greater than zero, the generator is controlled to increase a counter torque with respect to a driving direction of the generator or the motor is controlled to increase a driving torque of the motor, and when the difference value is smaller than zero, the generator is controlled to reduce the counter torque with respect to the driving direction of the generator or the motor is controlled to reduce the driving torque of the motor.

10. The method of claim 7, further comprising:
receiving a value of a gradient of a road on which the electric bicycle travels from a gradient sensor;
calculating a rotational acceleration of a pedal using the rotational position of the generator; and controlling a driving torque of the motor to be further increased on the basis of the value of the gradient of the road and the rotational acceleration of the pedal.

11. The method of claim 7, further comprising:
measuring a generator driving current between a battery and the generator using a generator current sensor; and
measuring a motor driving current between the battery and the motor using a motor current sensor,
wherein, in the controlling of the generator or the motor, the generator driving current is controlled using a target generator current generated based on the difference value as a reference value and using the measured generator driving current as a feedback value, and the motor driving current is controlled using a target motor current generated based on the difference value as a reference value and using the measured motor driving current as a feedback value.

12. The method of claim 11, wherein, in the controlling of the generator or the motor, when the difference value is greater than zero, the generator driving current is increased or the motor driving current is increased, and when the difference value is smaller than zero, the generator driving current is reduced or the motor driving current is reduced.

13. A device for driving a chainless electric bicycle, the device comprising:
a motor configured to drive a driving wheel;
a generator configured to generate power using a pedal;
a generator position sensor configured to measure a value of a rotational position of the generator;
a motor position sensor configured to measure a value of a rotational position of the motor;
a generator current sensor configured to measure a current of the generator;
a motor current sensor configured to measure a current of the motor; and
a controller configured to calculate a target pedal torque on the basis of a difference between a position of the generator which is measured by the generator position sensor and a position of the motor which is measured by the motor position sensor and control the current of the generator to reach the calculated target pedal torque.

14. The device of claim 13, wherein the controller calculates a target motor acceleration according to the calculated target pedal torque, calculates an acceleration of the motor from a change in the measured position of the generator, and controls the current of the motor so that the acceleration of the motor reaches the calculated target motor acceleration.

15. A method of controlling a device for driving an electric bicycle, which is performed by a controller including one or more processors, the method comprising:
receiving a position of a generator from a generator position sensor;
receiving a position of a motor from a motor position sensor;
calculating a target pedal torque on the basis of a difference between the position of the generator and the position of the motor; and
controlling a current of the generator to reach the calculated target pedal torque.

16. The method of claim 15, further comprising, after the controlling of the current of the generator:
determining a target motor acceleration according to the calculated target pedal torque;
calculating an acceleration of the motor from a change in a detected position of a pedal; and controlling a current of the motor so that the acceleration of the motor reaches the determined target motor acceleration.

\* \* \* \* \*